May 21, 1968 C. G. TREADWELL 3,384,834

FREQUENCY SYNTHESIZER

Filed May 25, 1966 5 Sheets-Sheet 1

Inventor
CYRIL G. TREADWELL
By [signature]
Attorney

May 21, 1968 C. G. TREADWELL 3,384,834

FREQUENCY SYNTHESIZER

Filed May 25, 1966 5 Sheets-Sheet 2

FREQUENCY SUBTRACTING CCT.

Inventor
CYRIL G. TREADWELL

By Percy P. Lantzy
Attorney

May 21, 1968 C. G. TREADWELL 3,384,834

FREQUENCY SYNTHESIZER

Filed May 25, 1966 5 Sheets-Sheet 3

Inventor
CYRIL G. TREADWELL

By Percy P. Lantzy
Attorney

Inventor
CYRIL G. TREADWELL
By [signature]
Attorney

Inventor
CYRIL G. TREADWELL
By [signature]
Attorney

United States Patent Office 3,384,834
Patented May 21, 1968

3,384,834

FREQUENCY SYNTHESIZER

Cyril Gordon Treadwell, Kings Langley, England, assignor to International Standard Electric Corporation, New York, N.Y., a corporation of Delaware Filed May 25, 1966, Ser. No. 552,947
Claims priority, application Great Britain, Aug. 27, 1965, 136,918/65
11 Claims. (Cl. 331—47)

ABSTRACT OF THE DISCLOSURE

A frequency synthesizer having a single fixed frequency master oscillator and which utilizes division, multiplication, addition and subtraction circuits for operating on sawtooth or stepped waveforms which are internally generated from the master oscillator. The output signal is adjustable in decades and no filter or modulator circuits are required.

This invention relates to frequency synthesizers in which the frequency of an electrical signal is adjustable in digital steps.

The main object of this invention is to provide an improved digital frequency synthesizer which utilizes no filters or modulator circuits and which does not produce unwanted sideband frequencies.

According to this invention, a frequency synthesizer for producing a selected frequency comprises means for generating a plurality of signals having different discrete frequencies, a plurality of frequency dividing means, means coupling said generating means to said frequency dividing means and adding means coupled to said plurality of frequency dividing means to algebraically add the frequencies of the frequency divided signals to produce an output signal having said selected frequency.

An embodiment of the invention will now be described with reference to the accompanying drawings in which.

Figure 1:
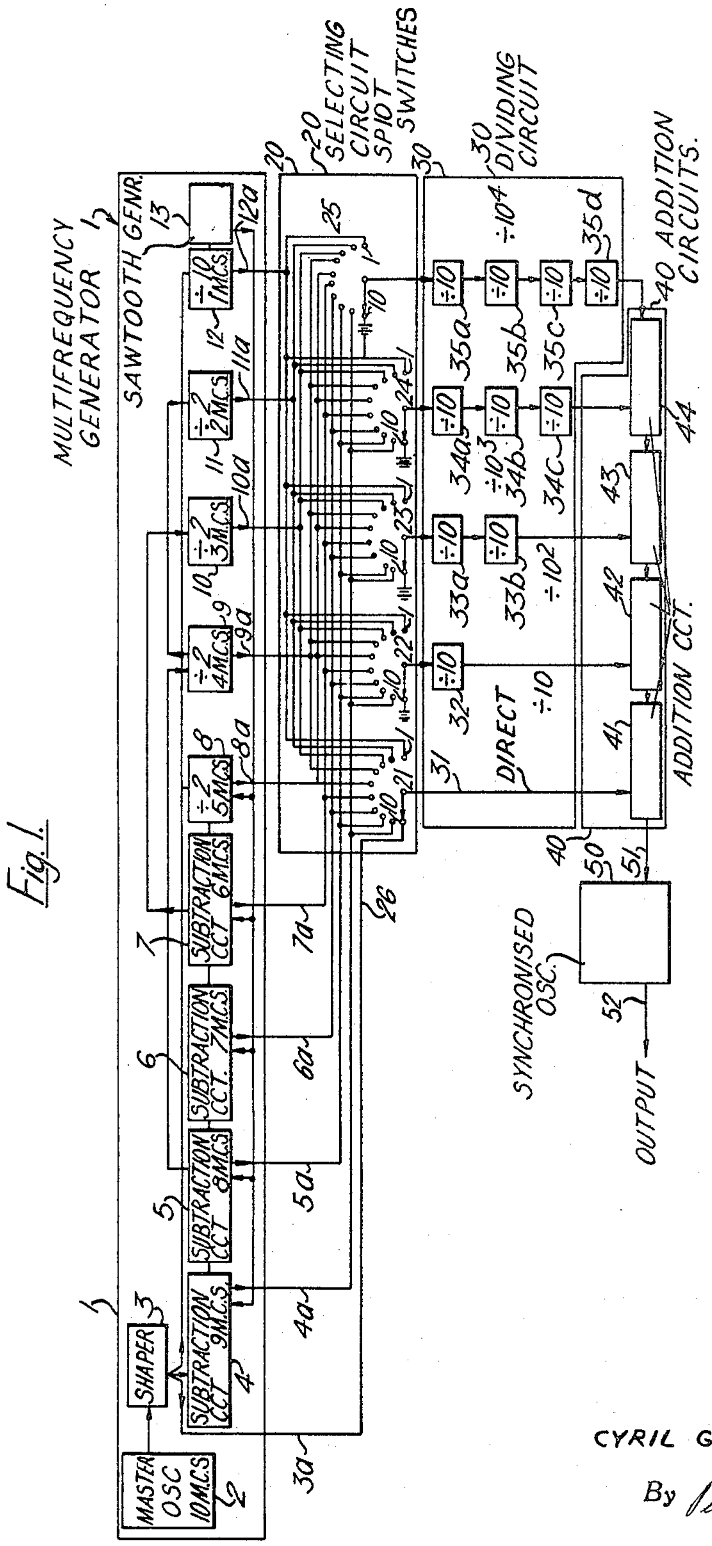
FIG. 1 is a block circuit diagram of the invention.

Referring to FIG. 1 which is the block circuit diagram of a first embodiment of the invention, the multifrequency generator 1 has 10 outputs having respective output signals 3*a* to 12*a* which comprise the basic decade of the oscillator. Each output 3*a* to 12*a* is connected to the selecting circuit arrangement 20. The circuit 20 has selectors, each being able to select any one of the ten basic decade signals. Each respective selector output is connected via the dividing circuit arrangement 30 to an addition circuit arrangement 40. The output of the addition circuit arrangement 40 is connected to a synchronized oscillator 50 which provides the output signal.

Considering FIG. 1 in greater detail, the multifrequency generator 1 includes a master oscillator 2 which, in this embodiment, is a 10 mc. stable crystal controlled oscillator. The master oscillator 2 is connected via a shaping circuit 3 which produces a pulse train of the same frequency as the master oscillator to a subtraction circuit 4 and two dividing circuits 8 and 12.

The dividing circuit 12 divides the 10 mc. signal by a factor 10 and produces an output signal of 1 mc. The dividing circuit 8 divides the 10 mc. signal by a factor 2 and produces an output signal of 5 mc. Dividing circuits which divide an input frequency by factors 2 and 10 are well known in the art and are not described further herein. The 1 mc. output signal is connected to a sawtooth generator circuit 13 which is common to the four subtraction circuits 4, 5, 6 and 7 which are described in greater detail later in this specification. Subtraction circuit 4 subtracts the 1 mc. output signal of circuit 12 from the 10 mc. signal and subtraction circuit 5 is connected to circuit 4 and subtracts the 1 mc. signal from the 9 mc. signal to produce an 8 mc. signal. Likewise subtraction circuit 6 is connected to circuit 5 and subtraction circuit 7 is connected to circuit 6 to produce 7 mc. and 6 mc. signals respectively. The three further dividing circuits 9, 10 and 11 each divide by a factor of 2. Dividing circuit 9 is connected to the output of circuit 5 to produce a 4 mc. signal from the 8 mc. signal, dividing circuit 10 to the output of circuit 7 to produce a 3 mc. signal from the 6 mc. signal and dividing circuit 11 to the output of circuit 9 to produce a 2 mc. signal from the 4 mc. signal. The ten output signals of elements 3 to 12 are the outputs of the multifrequency generator and provide the 10 signal frequencies from 1 to 10 mc. in steps of 1 mc. which form the basic decade of frequencies.

The selector circuit 20 consists of five single pole ten way switches 21 to 25 each having the ten ways respectively connected to the ten basic decade outputs of the multifrequency generator 1. The dividing circuit 30 consists of five separate chains, a wire line 31 (÷1) and a number of dividing circuits each dividing by a factor 10 arranged in four other dividing chains. A single divide by 10 circuit 32, two dividing circuits 33*a* and 33*b* connected in series to divide by 100, three dividing circuits 34*a*, 34*b* and 34*c* connected in series to divide by 1,000 and four dividing circuits 35*a*, 35*b*, 35*c* and 35*d* connected in series to divide by 10,000, provide said four other dividing chains, respectively, so producing four decades of frequency in descending successive decimal order. Each chain of dividing circuits is connected at its input to the pole of an associated switch of the selector circuit 20 and at its output to the addition circuit arrangement 40. Wire 31 connects switch 21 to addition circuit 41, chain 32 connects switch 22 to addition circuit 42, chain 33 connects switch 23 to addition circuit 43, chain 34 connects switch 24 to addition circuit 44 and chain 35 connects switch 25 also to addition circuit 44.

The output of addition circuit 44 is connected to addition circuit 43 which is further connected to addition circuit 42. Addition circuit 42 is connected to addition circuit 41, the output of which provides the output of the addition circuit arrangement 40.

The effect of the addition circuit arrangement 40 is to add the four decades of frequency signals to the basic decade signal (on wire 31) and since any frequency of the basic decade may be selected as the input to any dividing chain, the output signal of the addition circuit arrangement may be adjusted by the selectors to any frequency from 0 to 10.9999 mc. in steps of .0001 mc.

In this embodiment the signals produced by the addition circuit arrangement are pulse signals and to produce a sine wave signal the pulse signals are used to synchronize the oscillator 50. Synchronized oscillators are well known and any suitable type may be used. One method is to compare the frequency of the synchronized oscillation to the output of the addition circuit arrangement in a frequency comparator which produces a signal indicative of the frequency difference and to use this signal to adjust the frequency of the synchronized oscillator.

Figure 2:
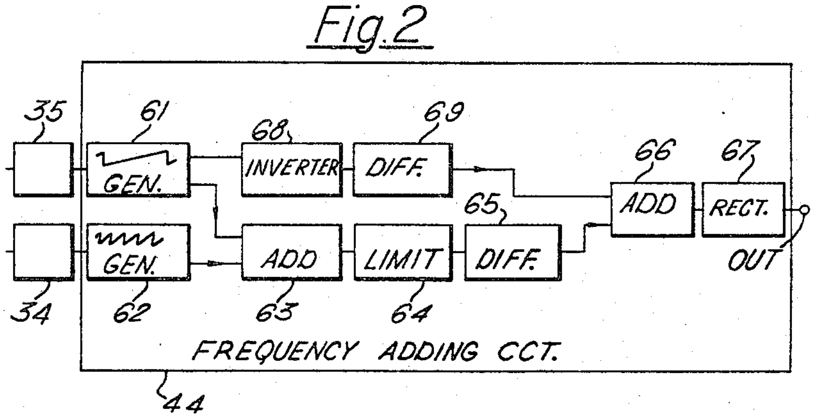
FIG. 2 is a block circuit diagram of an addition circuit according to the invention.
Figure 3:
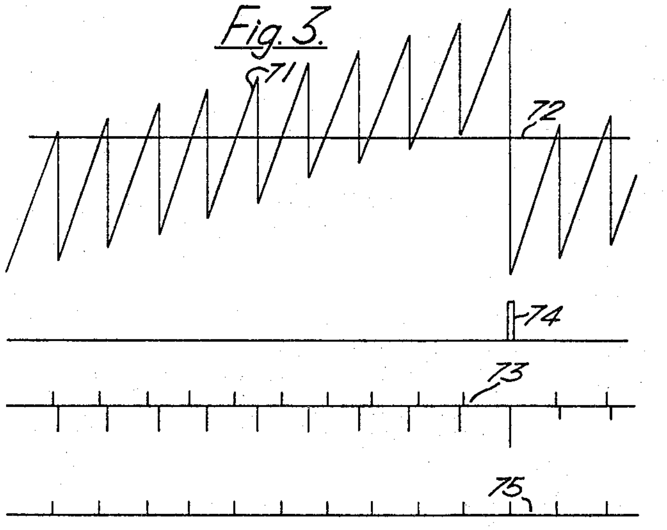
FIG. 3 illustrates waveforms used to describe the operation of the addition circuit FIG. 2.

The operation of the frequency addition circuits may be understood with reference to FIG. 2 and FIG. 3.

In addition circuit 44 the pulse train output from the dividing chains 34 and 35 are connected respectively to sawtooth generators 61 and 62, which produce sawtooth waveforms having the same frequency as their respective input signals, see FIGS. 2 and 3.

To reduce the production of unwanted frequencies the generators must produce a linear sawtooth waveform. Circuits suitable to produce such waveforms from a pulse input wave are well known. One suitable type of circuit is the Miller integrating circuit. The waveform outputs from the two generator circuits 61 and 62 are made equal in amplitude and are added in circuit 63. The waveform which results from this addition is shown at 71, FIG. 3. The output of circuit 63 is connected through a limiter circuit 64 to a differentiating circuit 65. The limiting level of circuit 64 is equal to the peak amplitude of an individual sawtooth waveform and removes the peaks of waveform 71 which rise above level 72, and differentiation by circuit 65 produces waveform 73, FIG. 3. The differentiating and inverting circuits 69 and 68 are also connected to generator 61 and produce waveform 74, FIG. 3. Waveform 74 is added to waveform 73 in circuit 66 and is rectified by circuit 67 to produce waveform 75. The waveform 75 is the output waveform of the circuit 44 and the pulses therein are numerically the sum of the two input pulse waves from the dividing chains 34 and 35.

The operation and the circuit details of the addition circuits 41, 42 and 43 are similar to circuit 44.

Figure 4:
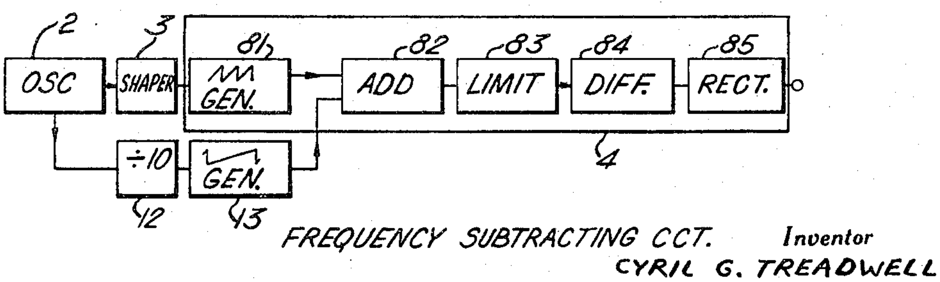
FIG. 4 is a block circuit diagram of a subtraction circuit according to the invention.
Figure 5:
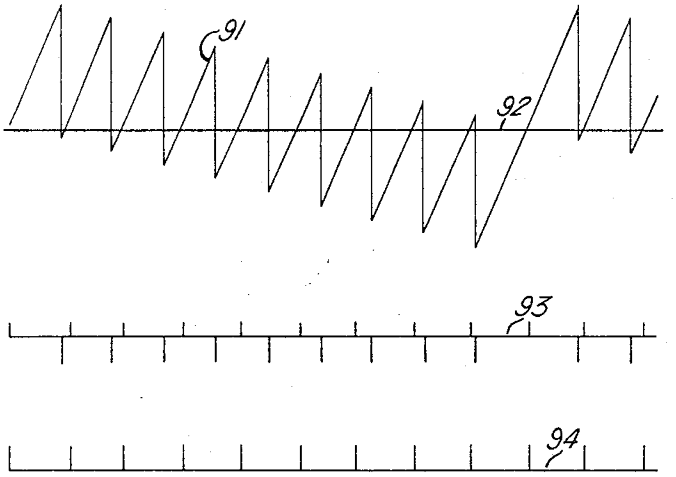
FIG. 5 illustrates waveforms used to describe the operation of the subtraction circuit FIG. 4.

The operation and the circuit details of the subtraction circuits 4, 5, 6 and 7 are identical. FIG. 4 shows the block circuit diagram and FIG. 5 illustrates the waveforms produced.

Referring to subtraction circuit 4 of FIG. 1, one of the two input waveforms is provided by the shaping circuit 3 which produces a square waveform and is connected to a sawtooth generator 81. The generator 81 produces a linear sawtooth waveform having the same recurrence frequency as the square wave shaping circuit 3. The sawtooth generator 13 provides a second input which is a sawtooth waveform having a recurrence frequency equal to the frequency of the output of dividing circuit 12. This generator 13 is common to all four subtraction circuits and produces a reversed sawtooth wave. The two sawtooth inputs are added in circuit 82 and produce the waveform 91 of FIG. 5. This waveform is limited by circuit 83 to maximum level 92 and the resulting waveform is differentiated by circuit 84 to produce waveform 93. Waveform 93 is rectified by circuit 85 to produce the output waveform 94 whose pulses have a recurrence frequency equal to the frequency of oscillator 1 minus the frequency of generator 13.

Figure 6:
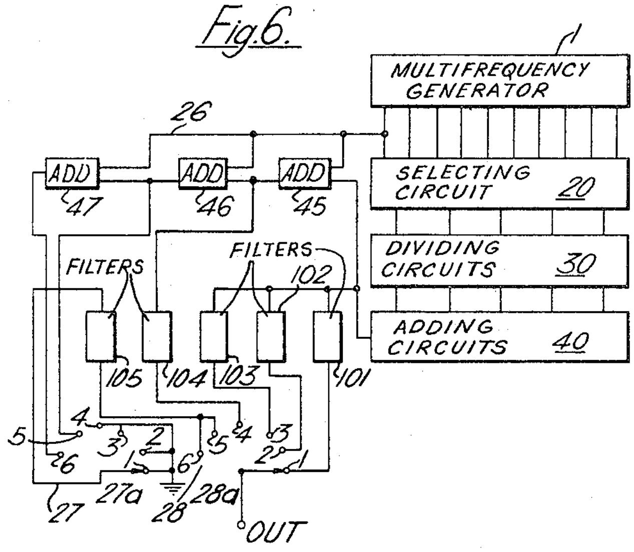
FIG. 6 is a block circuit diagram of a second embodiment of the invention.

FIG. 6 shows a second embodiment of the invention in which the frequency range of the oscillator is extended above the frequency of the master oscillator 2 by continued addition. In this embodiment the final output is produced by filtering.

In FIG. 6 the multifrequency generator 1, the selector circuit 20, the dividing chain 30, and the addition circuit arrangement 40 are identical to the corresponding elements of FIG. 1. These elements are also connected as described with reference to FIG. 1 except way 10 of switch 21 in this embodiment is connected to earth and not to lead 26. Three additional adding circuits 45, 46 and 47, identical to those previously described, are connected via lead 26 to the 10 mc. output from multifrequency generator 1. Circuit 45 is connected to the output of the addition circuit arrangement 40 to add 10 mc. and to produce an output signal having a frequency range of 10.0 mc. to 19.9999 mc. and circuit 46 is connected to the output of circuit 45 to add a further 10 mc. signal to produce an output signal having a frequency range of 20 mc. to 29.9999 mc. Likewise, circuit 47 provides the frequency range of 30 mc. to 39.9999 mc. To simplify the filter design a group of three filters 101 to 103 whose pass bands cover the range 0–10 mc. are used. The inputs of these filters are connected to the output of circuit 40. The input of filter 104 having a pass band 10–20 mc. is connected to the output of circuit 45 and the input of filter 105 having a pass band 20 to 40 mc. is connected to ganged selectors 27, 28. Selector 27 is a single pole 6-way switch having way **27*a* connected to the input of filter 105, way 5 connected to the output of circuit 46 and way 6 connected to the output of circuit 47. In selector 28 the way 28*a* is connected to the oscillator output, ways 6 and 5 are both connected to the output of filter 105 and ways 4, 3, 2 and 1 are connected to the output of filters 104, 103, 102 and 101 respectively. The selectors 27, 28 are operated to the required band after the selector 20** has been adjusted to give the units and decimal digits in mc. of the required frequency.

Further embodiments of the invention are possible in which the circuit arrangement 40 is a series of subtraction circuits in place of addition circuits 41 to 44 and in which frequency ranges higher than the master oscillator are obtained by multiplication.

The groups of filters described with reference to FIG. 6 are a preferred arrangement and other groupings well known in the art may be used.

As previously stated the linearity of the sawtooth generators at low frequencies must be very good. For instance if 10 mc./s. is mixed with 100 c./s. to produce 10.0001 mc./s. the worst case is obtained. If flattening of the slope of the low frequency wave occurs, the output frequency can swing over a range of 100 c./s. each cycle of the LF wave.

Figure 7:
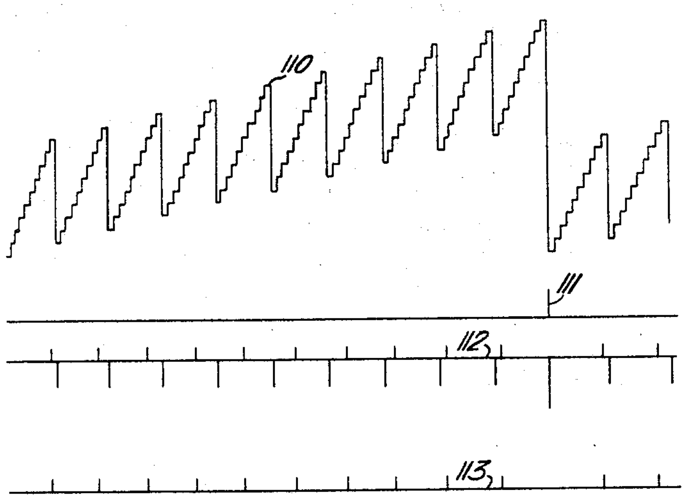
FIG. 7 illustrates the waveforms used in an alternative embodiment of the addition circuit.

An alternative method which avoids this non-linearity problem is to use the stepped wave 110 of FIG. 7 instead of a sawtooth wave.

Figure 8:
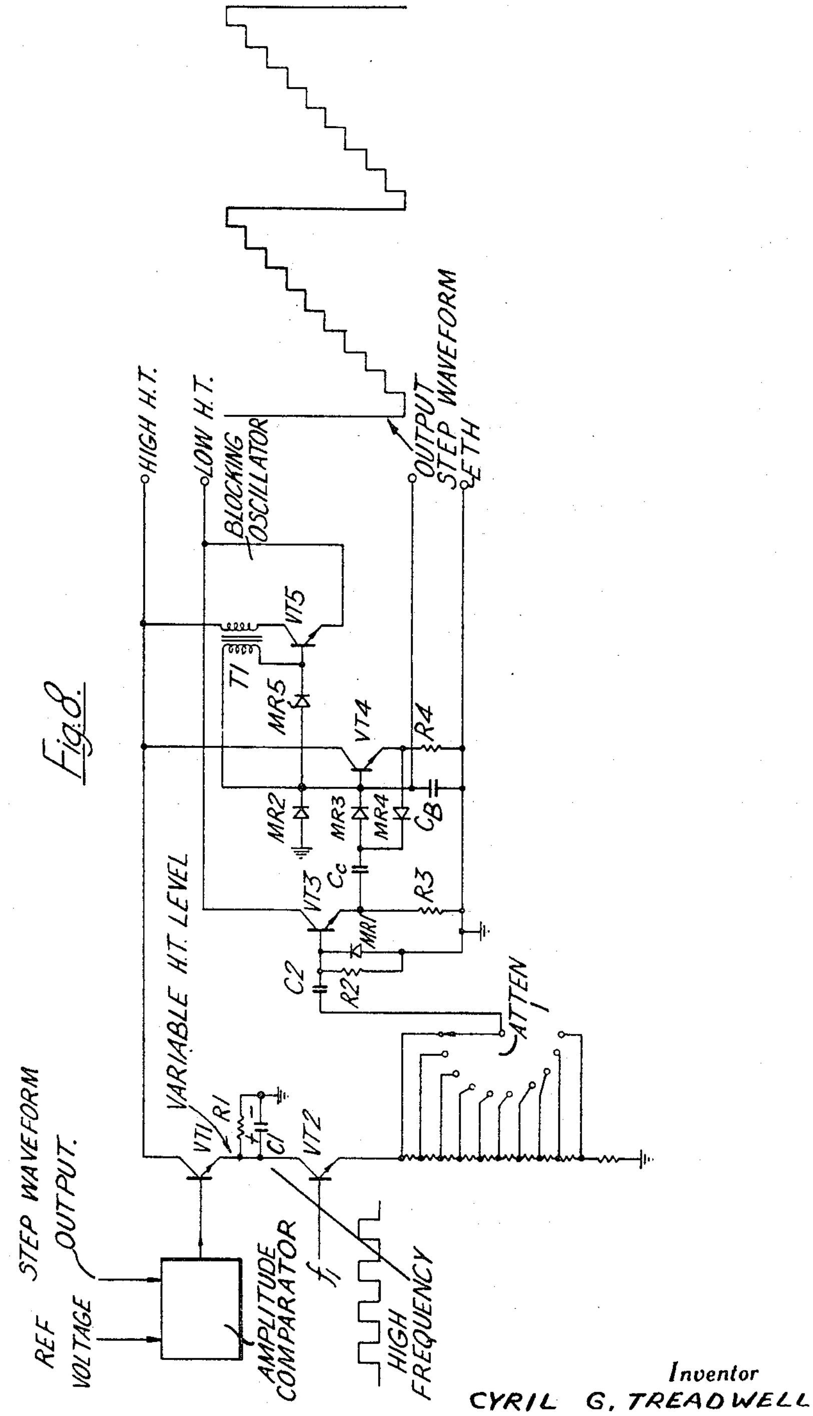
FIG. 8 illustrates in detail part of the circuit used to produce the waveforms of FIG. 7.

The circuit used to produce a linear stepped waveform is shown in FIG. 8, and the waveforms 110 to 113 of FIG. 7 correspond to waveforms 71, 73, 74 and 75 respectively.

Referring to FIG. 8, the 10 mc. square wave signal $f_1$, derived from shaper 3 (in FIG. 1), is used as the stepping frequency and is applied to the base of VT2. The transistor VT2 is saturated by each positive swing of the $f_1$ signal. Therefore, each voltage kick produced at the emitter of VT2 is very nearly the HT voltage applied to the collector of VT2, which is the voltage at the emitter of VT1. The function of VT1 is to change the level of this HT voltage under the control of the amplitude comparator. This will be expanded after the rest of the circuit has been described.

Positive pulses from the VT2 emitter go via the attenuator and large blocking condenser C2 to the base of VT3. This transistor has a low value of emitter resistance R3 in order to produce a sharp trailing edge to each pulse produced at the emitter of VT3. VT3 is therefore driven hard so that the peak positive voltage on its emitter corresponds very closely to the collector peak voltage.

Diode MR1 is therefore included as a DC restorer to discharge C2 to prevent the building up of a biasing voltage.

Coupled to the emitter of VT3 is a modified "cup and bucket" circuit in which $C_c$ is the "cup" and $C_B$ is the "bucket."

In the orthodox "cup and bucket" circuit the steps of voltages produced across condenser $C_B$ are of exponential form. The reason for this is that the charge of current delivered to the cup condenser $C_c$ is normally constant for each applied step, i.e., the right-hand side of $C_c$ rises to the same voltage each time. The result is that the differential voltage applied to $C_B$ becomes progressively less at each step. Therefore the amplitude of each step across $C_B$ becomes progressively less.

In the modified cup and bucket circuit the voltage developed across $C_c$ for each step is arranged to be a constant amount above the level of the voltage developed across $C_B$ at each step. The circuit shown in FIG. 8 meets these conditions.

At the beginning of a cycle VT3 is off and there is no voltage across $C_c$ or $C_B$. VT4 is off.

The first pulse of one unit amplitude applied to VT3 raises its base, and also its emitter (very nearly) to the level of 1 unit. If the capacity values of $C_c$ and $C_B$ are chosen so that $$\frac{C_B+C_c}{C_c}=10$$

then the potential across $C_B$ will be raised instantaneously to the level of $1/10$ unit. Assuming negligible forward voltage drop in MR3 and VT4, the emitter of VT4 will also rise to the level of $1/10$ unit and, also assuming no forward voltage drop in MR4, the right-hand side of $C_c$ will rise to, and be held by the low impedance source of VT4 emitter to the level of $1/10$ unit.

In the next part of the cycle the base of VT3 returns to earth level. The emitter of VT3 also drops to earth level due to the low resistance of R3.

The right-hand side of $C_c$ is held at a level of $1/10$ unit because of the holding effect of MR4 connected to VT4 emitter and the $1/10$ unit amplitude level applied to VT4 base by the charge across $C_B$.

At the beginning of the next cycle the left side of $C_c$ is raised, as before, by the level of 1 unit, but this time the right-hand side starts at a level of $1/10$ unit and is raised to $2/10$ unit level.

Condenser $C_B$ therefore receives the same additional charge as the first step and therefore the voltage across $C_B$ rises to a level of $2/10$ unit. At the end of this cycle the right-hand side of $C_c$ is held at $2/10$ unit so that for the next step $C_B$ goes up to $3/10$ unit.

This process continues linearly until the voltage across $C_B$ rises to the level of the low HT. At this condition the blocking oscillator associated with VT5 triggers and discharges condenser $C_B$. An inverse charge of $C_B$ is prevented by clamping diode MR2. The whole cycle then starts again. This type of circuit has been built and a one stage division of 20 has been achieved. The number of division steps obtained is limited by the small steps which are obtained with larger numbers of division steps.

Discharge of $C_B$ is controlled by an accurately timed pulse from one of the dividers in the main circuit and therefore does not depend upon the amplitude across $C_B$ triggering the blocking oscillator. The latter circuit is biased off until reception of the accurately timed triggering pulse.

In order to obtain the correct amplitude at the last pulse of the stepped waveform the latter is delivered to the amplitude comparator and compared with the reference voltage. Any difference is converted to a D.C. control voltage which is delivered to transistor VT1 base.

The Collector/Emitter resistance of transistor VT1 varies according to the amplitude of the control voltage. Transistor VT1 with R1 form a potentiometer to control the HT collector voltage of transistor VT2. The latter is driven to saturation by each positive peak of the incoming pulses. Therefore, the emitter peak voltage of transistor VT2 varies with its collector HT voltage. The effect of this is to adjust the amplitude of the steps of the step waveform so that they add up to the correct voltage at the end of the step waveform.

Attenuator ATTEN. 1 is included to reduce the pulse amplitude applied to the base of transistor VT3. This will directly reduce the amplitude of the steps so that the stepped waveform can be used for lower frequencies.

It is to be understood that the foregoing description of specific examples of this invention is made by way of example only and is not to be considered as a limitation on its scope.

I claim:

1. A frequency synthesizer for producing a selected frequency comprising:
- means for generating a plurality of signals having different discrete frequencies;
- a plurality of frequency dividing means;
- switching means coupling said generating means to said frequency dividing means; and
- adding means coupled to said plurality of frequency dividing means to algebraically add the frequencies of the frequency divided signals to produce an output signal having said selected frequency.

2. The frequency synthesizer according to claim 1 wherein said switching means includes a plurality of frequency selectors for applying selected ones of said plurality of discrete signals to said dividing means.

3. The frequency synthesizer according to claim 1 further comprising a synchronized oscillator coupled to the output of said adding means.

4. A frequency synthesizer according to claim 2 wherein said generating means includes:
- a source of a reference frequency signal;
- means coupled to said source of reference frequency for providing said plurality of different discrete frequencies; and
- a plurality of outputs coupled to said providing means, a different one of said plurality of signals appearing on each said output.

5. The frequency synthesizer according to claim 4 wherein said providing means comprises:
- first frequency subtracting means coupled to said source of reference frequency for producing a first portion of said plurality of signals;
- first frequency dividing means coupled to said source of reference frequency for producing a second portion of said plurality of signals;
- second frequency subtracting means coupled to said first frequency subtracting means for producing a third portion of said plurality of signals;
- second frequency dividing means coupled to said first frequency dividing means for producing a fourth portion of said plurality of signals; and
- means coupling the outputs of said first and second subtracting and dividing means to said plurality of outputs.

6. The frequency synthesizer according to claim 4 wherein said plurality of frequency selectors comprises a plurality of multi-position selector switches, each said switch being coupled to the outputs of said generating means for causing any of said plurality of signals to appear at the output of each said selector switch.

7. The frequency synthesizer according to claim 6 wherein:
- said generating means produces a plurality of signals, the frequencies of which are equally spaced; and
- said plurality of dividing means are dimensioned such that each frequency selector corresponds to one digit of the desired output frequency of said synthesizer.

8. The frequency synthesizer according to claim 2 including:
- means for coupling at least one of said frequency selectors directly to said adding means; and
- means for coupling at least one of said frequency selectors to said adding means via at least one of said plurality of frequency dividing means.

9. The frequency synthesizer according to claim 8 wherein said adding means includes a plurality of frequency adding circuits, the first of said adding circuits being coupled to two of said frequency selectors, each further adding circuit being coupled to one frequency selector and to the output of the preceding adding circuit, the last of said adding circuits providing a frequency which is the sum of the frequencies applied to said adding means.

10. The frequency synthesizer according to claim 5 wherein each said frequency subtracting means includes:

a first triggered sawtooth generator;

means coupling the input of said first sawtooth generator to said source of reference frequency;

a source of a second sawtooth signal;

a voltage adding circuit coupled to the output of said first sawtooth generator and to said source of second sawtooth signal;

a differentiator coupled to said voltage adding circuit; and rectifying means coupling the output of said differentiator, the output thereof providing the output of said subtracting means.

11. The frequency synthesizer according to claim 7 wherein said frequency adding means include:

a first triggered sawtooth generator coupled to a first input of said frequency adding means;

a second triggered sawtooth generator coupled to a second input of said frequency adding means;

a first voltage adding means coupled to said sawtooth generators;

inverting means further coupled to said first sawtooth generator;

a first differentiator coupled to said inverting means;

a second differentiator coupled to said first voltage adding means;

a second voltage adding means coupled to said first and second differentiators; and rectifying means coupling said second voltage adding means to the output of said frequency adding means.

References Cited

UNITED STATES PATENTS 3,312,909 4/1967 Bryant ............ 331—51 X

ROY LAKE, *Primary Examiner.*

S. H. GRIMM, *Assistant Examiner.*